July 5, 1949.　　　　　T. R. SMITH　　　　　2,475,206
HYDRAULIC FLOW VALVE
Filed March 13, 1943　　　　　　　　　　　　　　　　2 Sheets-Sheet 1
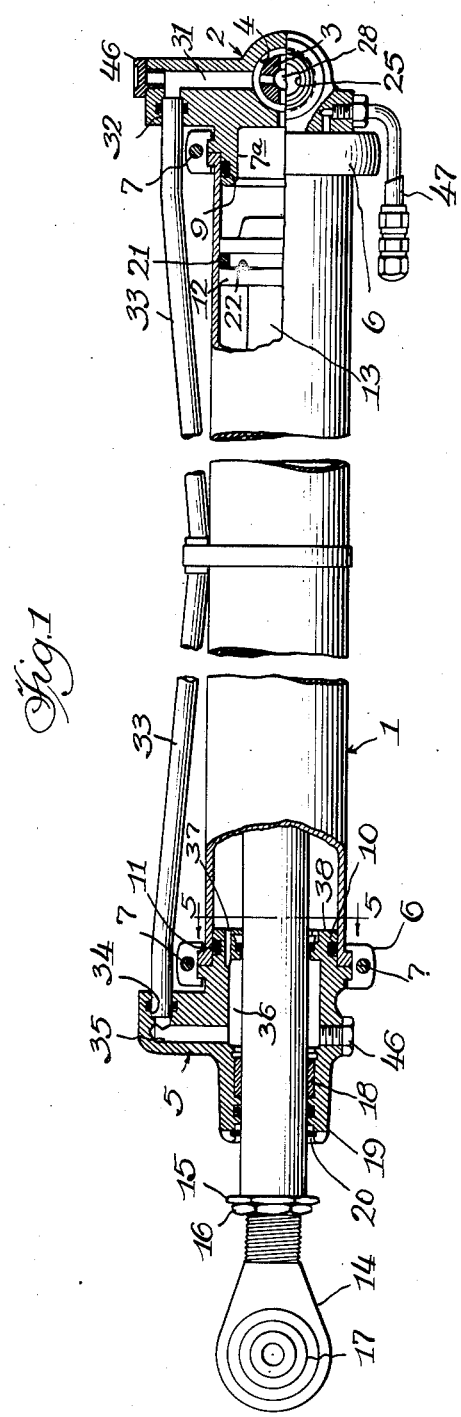
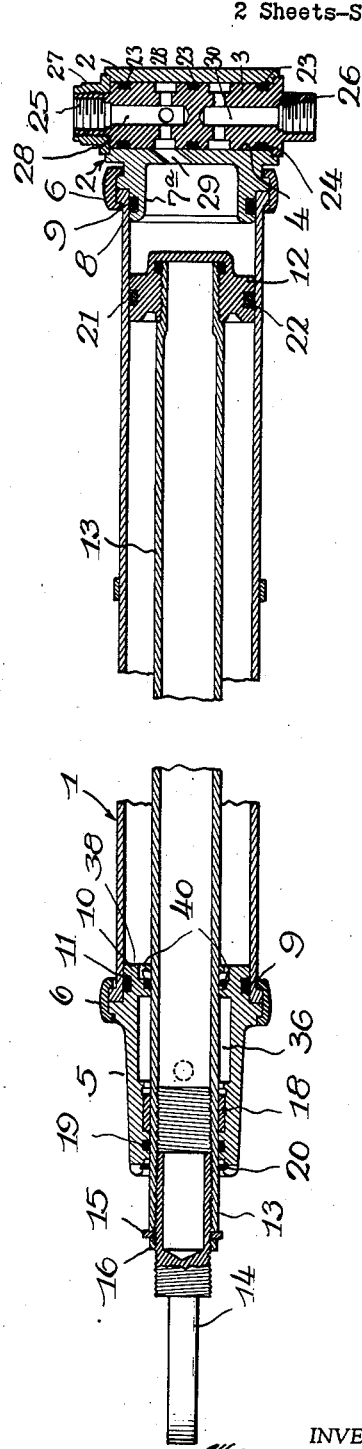
INVENTOR.
Thomas R. Smith
BY Parkinson & Lane
Attys July 5, 1949.   T. R. SMITH   2,475,206
HYDRAULIC FLOW VALVE
Filed March 13, 1943   2 Sheets-Sheet 2
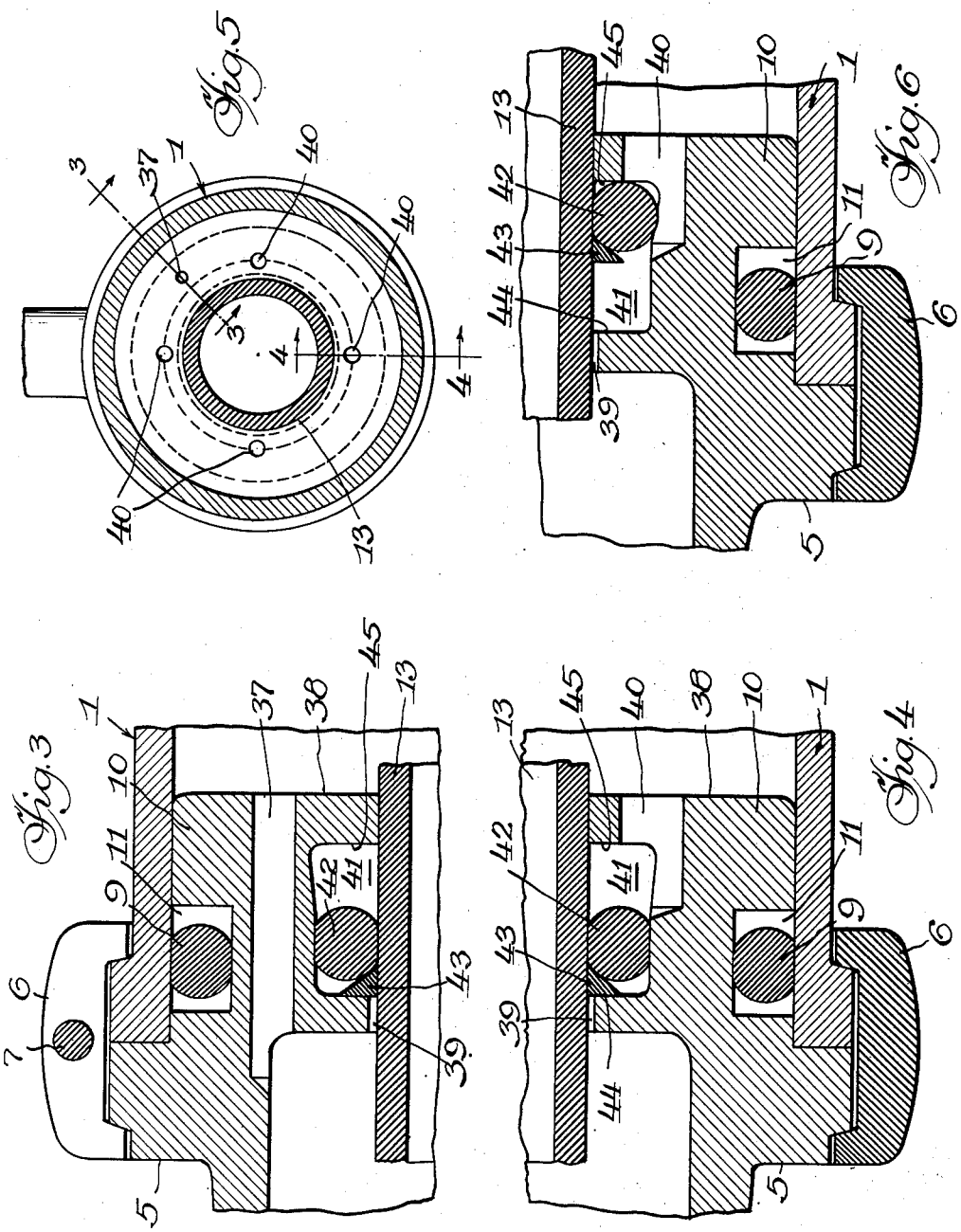
INVENTOR.
Thomas R. Smith
BY Parkinson & Lane
Attys
Witness:
Chas. R. Koush Patented July 5, 1949

2,475,206

UNITED STATES PATENT OFFICE 2,475,206

HYDRAULIC FLOW VALVE

Thomas R. Smith, Newton, Iowa, assignor to The Maytag Company, Newton, Iowa, a corporation of Delaware Application March 13, 1943, Serial No. 479,078

8 Claims. (Cl. 251—127)

The present invention relates to a novel construction of flow valve for controlling the transmission of fluid under pressure, and which in one position permits the transmission of the fluid and in another position prevents such fluid transmission. In the preferred embodiment the valve construction comprehends the provision of a pair of relatively reciprocatory members, such as a cylinder and piston, one of which is provided with an annular recess opening toward the other and a plurality of passages opening into the recess, and a shiftable sealing ring provided in the recess and of greater cross-section than the depth of the recess but appreciably less than the width of the recess, whereby when the ring is moved axially in the recess in one direction by the pressure of the fluid and any relative movement of the members, this ring seals and prevents the flow of the fluid through the recess, and when moved axially in the recess in the other direction, passage of fluid through the recess is permitted.

The invention further comprehends a novel valve arrangement provided with a series of openings, certain of which are opened for the passage of the hydraulic fluid only when the fluid moves the piston in a cylinder in one direction, and these openings are automatically closed when the hydraulic fluid moves the piston in the opposite direction to thereby give it a snubbing or decelerated action.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a fragmentary view, part in side elevation and part in vertical cross section, through a hydraulic actuating strut assembly for operating the nose wheel of an airplane and showing one embodiment of the novel flow valve applied thereto.

Figure 2 is a fragmentary view in horizontal cross section through the assembly shown in Figure 1.

Figures 3 and 4 are enlarged fragmentary views in vertical cross section through the hydraulic flow valve assembly taken on the lines 3—3 and 4—4, respectively, of Figure 5, and showing the position of this valve assembly when the piston rod is retracted to raise the nose wheel.

Figure 5 is a view in vertical cross section taken in a plane represented by the line 5—5 of Figure 1.

Figure 6 is a view similar to Figure 4 but showing the position of the valve assembly when the piston rod has been forced outwardly by the fluid under pressure.

Referring more particularly to the illustrative embodiment of the novel flow valve disclosed in the drawings, the valve is shown associated with an actuating strut assembly comprising a cylinder 1 having a head 2 adapted to pivot or swivel about the pivot pin 3 passing through the bearing opening 4 in the head. Upon the other end of the cylinder is mounted a housing 5. The connection between the cylinder and its head 2 is made through a split clamp 6 having its semicircular sections connected by means of adjusting screws 7, which after they have been adjusted to the proper position, are preferably locked in position by any suitable means to prevent their accidental or unintentional loosening or removal.

To prevent leakage, the inner annular end 7a of the head 2 is provided with an outwardly opening annular recess 8 for the reception of a substantially circular sealing ring 9 formed of a resilient sealing composition such as natural or compounded synthetic rubber. Similarly, the inner annular end or radially extending part 10 of the housing 5 is provided with an annular outwardly opening channel or recess 11 for the reception of a sealing ring 9 and this housing is connected to the cylinder by a split clamp 6. These sealing rings are of less diameter or cross section than the width of the recesses or channels 8 and 11, but of greater diameter or cross section than the depth of these recesses whereby the sealing rings are compressed sufficiently to form a tight sealing contact with the interior of the cylinder, and due to the fact that they may pivot, permit relative movement between the parts being sealed.

The piston 12 and piston rod 13 upon an end of which the piston is threaded, are adapted to be moved outwardly and with the latter carrying with it the end fitting 14 threaded into the interior of the piston rod and locked thereto by means of a lock plate 15 and lock nut 16. This fitting carries a bearing 17 and through suitable linkage mechanism, raises and lower the nose wheel (not shown) of the airplane. In order to properly guide the piston rod and seal the space between the piston rod and the housing 5, a suitable bushing 18, sealing ring 19 and wiper ring 20 are provided.

A sealing ring 21 positioned within an outwardly opening channel or groove 22 in the periphery of the cylindrical wall of the piston 12, provides a wiping contact and seals the space between the piston and the interior wall of the cylinder. Similar sealing rings 23 are provided in spaced annular grooves 24 in the pivot pin 3 to prevent leakage between this pin and its encompassing head 2, the latter permitting the cylinder to swivel about the pin. This pivot pin is provided with threaded connections 25 and 26 at its opposite ends, and is retained within the cylindrical opening 4 by an adjustable pivot nut 27. Hydraulic pressure is applied alternately from one side of the pivot pin to the other. When the pressure is applied to the end containing the connection 25, the fluid or oil enters through the passage 28 and opening 29 in the head 2 and into the cylinder and forces the piston rod 13 outward, thereby actuating the strut mechanism to lower the wheel. When the pressure is applied to the end of the pivot pin 3 having the connection 26, the hydraulic fluid is by-passed through the opening 30, passage 31 and opening 32 in the head, to the transfer tube 33, from where it passes through the opening 34, passage 35 and annular space 36 in the housing 5. The hydraulic fluid then passes through the hole 37 in the face 38 of the housing, which may be approximately $\frac{3}{32}$" in diameter, and may also pass through the annular space 39 between the inner diameter of the face 38 and thence through the spaced holes 40, but such passage is controlled by the novel flow valve of the present invention.

In this flow valve assembly, any number of and size of the openings 40 may be provided for the passage of fluid, although in the drawings I show four of these holes each having a diameter of approximately $\frac{1}{8}$". In order that the hydraulic fluid may pass through the annular space 39 and openings 40 in but one direction, an annular channel recess or groove 41 is provided in the annular radial part 10. In this recess or groove is located a resilient and compressible sealing ring 42 and there is also preferably provided therein an annular support 43 for this ring slidably mounted on the piston rod, but where there is no danger of the sealing ring from being extruded into the annular space 39, this support 43 may be omitted. This sealing ring when moved to the position shown in Figures 3 and 4 and in which it seats against the shoulder 44, obstructs the passage of the hydraulic fluid tending to pass through the spaced holes or openings 40 outwardly through the annular space 39, when the piston rod 13 is moved outward in the illustrative embodiment, thus causing a snubbing action and resulting in minimum shock as the fluid within the cylinder in the space between it and the piston rod 13 can only exhaust or pass through the single hole 37.

When the hydraulic fluid enters the tubing 33 under pressure to move the piston rod inwardly, the pressure of this fluid will unseat and force the support 43 and sealing ring 42 away from the shoulder 44 and into the position shown in Figure 6, in which position it seats against the shoulder 45 and uncovers the openings 40 to permit the fluid to pass through the annular space 39 and then through the spaced holes or openings 40, as well as through the opening or hole 37 to thereby quickly raise the wheel after take-off.

The sealing rings are all of a compressible and resilient material such as natural or compounded synthetic rubber or the like, and each is of a cross section or diameter less than the width of the recess or groove in which it is mounted, but of a cross section greater than the depth of this recess or groove, whereby the sealing ring may pivot and permit relative movement between the parts being sealed, but at all times exert sufficient contact or pressure to maintain optimum sealing effect.

From the above description and the disclosure in the drawings it will be apparent that this novel flow valve assembly gives a snubbing action in one direction which may be utilized on the landing gear strut to let the nose wheel of the airplane down with a minimum amount of shock, while in the other direction it permits this nose wheel to be brought up quickly after take-off of the airplane.

A bleeder plug 46 and a bleeder line assembly 47 are preferably provided for bleeding or exhausting the hydraulic fluid from the system or assembly when that becomes necessary.

Although I have disclosed in the illustrative embodiment my novel flow valve employed in a cylinder and piston assembly in which the piston rod is freely movable in one direction and snubbed when moved in the opposite direction, it will be evident that the present novel flow valve has a wide application and that its use is not limited to the particular embodiment disclosed but may be employed wherever one of a pair of relatively reciprocatory members is to be freely movable in but one direction.

Having thus disclosed the invention, I claim:

1. A valve for fluid under pressure comprising a member provided with an annular recess of slightly varying depth and a plurality of passages communicating with said recess, and an uninterrupted passage through the member permitting flow of the fluid in either direction, and sealing means axially shiftable within the annular recess and including a resilient sealing ring of greater cross-sectional diameter than the depth of the narrow portion of said recess but appreciably less than the width of the recess and actuated by the fluid pressure to allow passage of the fluid through the passages communicating with the recess when fluid pressure is applied to one end of the valve, and to close these passages when fluid pressure is applied to the other end of the valve.

2. A flow valve comprising a member having a smooth annular surface, a second member having a projecting portion disposed adjacent the first mentioned member and provided with an annular recess opening toward the first member and of substantial width with the base of the recess chamfered at one side to thereat increase the depth of the recess, said second member having a plurality of passages for fluid including an uninterrupted passage for the flow of fluid in either direction and other passages communicating with the annular recess, and an annular axially shiftable resilient sealing ring disposed within the annular recess having a cross-sectional diameter appreciably less than the width of the recess but slightly greater than its depth at its unchamfered side, said sealing ring being actuated by the pressure of the fluid to the chamfered side of the recess to allow the passage of fluid through the passages communicating therewith when pressure is in one direction and actuated to the opposite side of the recess to seat the adjacent members and to prevent flow of fluid through these passages when the pressure is in the opposite direction.

3. A flow valve comprising a stationary member having a smooth cylindrical surface, a reciprocating cylindrical member therein, one of said members having a part projecting into proximity with the other member and provided with an annular recess of varying depth opening toward and defining with the adjacent surface of the other member an annular space and further provided with a plurality of passages extending from the opposite sides of said part into and communicating with the recess for permitting the flow of hydraulic fluid therethrough, and a restricted passage extending through said part to permit the uninterrupted flow of hydraulic fluid in either direction, and an annular resilient sealing ring disposed in said recess and having a cross section less than the width of the annular recess to permit the sealing ring to shift axially in the recess and with a portion of the recess of less depth than the cross section of the sealing ring whereby to provide a gripping action between the reciprocating member and the sealing ring to aid in the axial movement of the ring, said resilient sealing ring being actuated by the fluid under pressure and motion of the reciprocating members to one position in the recess to permit substantially unrestricted flow of fluid in one direction through the passages communicating therewith and shiftable to a second position in the recess when the motion of the reciprocating member and fluid pressure are reversed to prevent the flow of fluid through said communicating passages and in which latter position the sealing ring is in sealing contact with both of said members.

4. A check valve for controlling the flow of fluid from an expandible and contractible chamber comprising two members having concentric surfaces, one of said members being provided with an annular recess opening toward and defining with the adjacent surface of the other member a confined space substantially rectangular in cross section but of slightly varying depth and further provided with a plurality of passages from the opposite sides thereof opening into the recess for the transfer of fluid therethrough, and an annular axially shiftable resilient sealing ring disposed in the recess and having a cross-sectional diameter normally greater than the depth of the recess for the greater portion of its width and of considerably less cross-sectional diameter than the width of the recess whereby to contact said adjacent surface of said other member and the bottom of the recess when it is in one position therein, said ring being shifted to one side of the recess by the pressure of the fluid to permit the passage of fluid through the valve including the flow of fluid between the adjacent members, and shiftable to the opposite side of the recess by the reverse flow of fluid so that the sealing ring contacts and prevents the flow of fluid through said valve, said member having the recess being provided with an additional restricted passage which permits continuous flow of fluid through the valve independently of the position of the sealing ring in the recess.

5. A flow valve comprising a pair of concentric members, one of said members having an annular portion conforming to and projecting into close relationship with the adjacent concentric surface of the other member and provided with an annular recess opening toward said member, said annular portion having a restricted passage therethrough and spaced passages extending from the opposite sides of said annular portion and opening inwardly into said annular recess and including an annular passage adjacent said other member, and a resilient sealing ring disposed in said annular recess and having a width substantially less than the width of the recess whereby the sealing ring is shiftable from a position at one side to a position at the other side of said recess and in one position being forced into the space between the base of the recess and the adjacent surface of the other member whereby to seal against transmission of fluid through said spaced passages, and in the other position permitting transmission of fluid through these passages, the restricted passage transferring fluid from one side to the other side of the annular portion independently of the position of the sealing ring.

6. A flow valve for permitting transmission of fluid under pressure when in one position and preventing fluid transmission when in another position, comprising a pair of concentrically arranged and relatively reciprocatory members one of which is provided with a radially extending part having a circumferential wall projecting into close relationship with the adjacent concentric surface of the other member, an annular channel of varying depth provided in the circumferential wall and opening toward said adjacent concentric surface, said radial part having transversely arranged passages extending from the opposite sides thereof and opening into said annular channel and an uninterrupted passage through said radial part, and a resilient sealing ring of greater cross-section than the depth of a portion of the channel whereby to provide a gripping action between the reciprocating member and the sealing ring and the latter being of less cross-section than the width of the channel, said ring being positioned in and shiftable axially of the channel whereby in one position the sealing ring is moved by the pressure of the fluid and the gripping action between the reciprocating member and the ring into a position at one side of the channel in which to seal against the transmission of fluid through the channel, and when moved to a position at the other side of the channel passage of fluid through the channel is permitted.

7. A valve for fluid under pressure comprising a member provided with an annular recess of slightly varying depth and a plurality of passages communicating with said recess, and an uninterrupted passage through the member permitting flow of the fluid in either direction, and sealing means axially shiftable within the annular recess and including an annular support and a resilient sealing ring of greater cross-sectional diameter than the depth of the narrow portion of said recess but appreciably less than the width of the recess and actuated by the fluid pressure to allow passage of the fluid through the passages communicating with the recess when fluid pressure is applied to one end of the valve, and to close these passages when fluid pressure is applied to the other end of the valve.

8. A flow valve for permitting transmission of fluid under pressure when in one position and preventing fluid transmission when in another position, comprising a pair of concentrically arranged and relatively reciprocatory members one of which is provided with a radially extending part having a circumferential wall projecting into close relationship with the adjacent concentric surface of the other member, an annular channel of varying depth provided in the circumferential wall and opening toward said adjacent concentric surface, said radial part having transversely arranged passages extending from the opposite sides thereof and opening into said annular channel and an uninterrupted passage through said radial part, and sealing means including an annular support and a resilient sealing ring of greater cross-section than the depth of a portion of the channel whereby to provide a gripping action between the reciprocating member and the sealing ring and the latter being of less cross-section than the width of the channel, said sealing means being positioned in and shiftable axially of the channel whereby in one position the sealing means is moved by the pressure of the fluid and the movement of one of said members into a position at one side of the channel in which to seal against the transmission of fluid through the channel, and when moved to a position at the other side of the channel passage of fluid through the channel is permitted.

THOMAS R. SMITH.

REFERENCES CITED

The following references are of record in the file of this patent:

UNITED STATES PATENTS

| Number | Name | Date |
| --- | --- | --- |
| 306,351 | Porter | Oct. 7, 1884 |
| 768,042 | Ginaca et al. | Aug. 23, 1904 |
| 961,039 | Starr | June 7, 1910 |
| 1,164,371 | Lovejoy | Dec. 14, 1915 |
| 1,235,338 | Lemp | July 31, 1917 |
| 1,890,574 | Dubrovin | Dec. 13, 1932 |
| 2,107,494 | Onions | Feb. 8, 1938 |
| 2,244,894 | Parker | June 10, 1941 |
| 2,264,923 | Waseige | Dec. 2, 1941 |

FOREIGN PATENTS

| Number | Country | Date |
| --- | --- | --- |
| 62,766 | Germany | June 18, 1892 |
| 141,473 | Germany | 1900 |